(12) United States Patent
Mowbray

(10) Patent No.: US 12,146,722 B2
(45) Date of Patent: Nov. 19, 2024

(54) LIQUID DISPENSING APPARATUS

(71) Applicant: ZURU (SINGAPORE) PTE. LTD., Singapore (SG)

(72) Inventor: Mathew Peter Mowbray, Cambridge (NZ)

(73) Assignee: ZURU (SINGAPORE) PTE. LTD., Singapore (SG)

( * ) Notice: Subject to any disclaimer, the term of this patent is extended or adjusted under 35 U.S.C. 154(b) by 342 days.

(21) Appl. No.: 17/435,844

(22) PCT Filed: Mar. 8, 2019

(86) PCT No.: PCT/IB2019/051872
§ 371 (c)(1),
(2) Date: Sep. 2, 2021

(87) PCT Pub. No.: WO2020/183216
PCT Pub. Date: Sep. 17, 2020

(65) Prior Publication Data
US 2022/0155040 A1   May 19, 2022

(51) Int. Cl.
*F41B 9/00*   (2006.01)
*B05B 9/08*   (2006.01)

(52) U.S. Cl.
CPC .......... *F41B 9/0059* (2013.01); *B05B 9/0822* (2013.01); *F41B 9/0018* (2013.01)

(58) Field of Classification Search
CPC .. F41B 9/0018; F41B 9/0059; F41B 19/0062; B05B 9/0822

(Continued)

(56) References Cited

U.S. PATENT DOCUMENTS 2,678,753 A * 5/1954 Hersey .................... F41B 9/004
222/79
3,022,779 A   2/1962 Benkoe
(Continued)

FOREIGN PATENT DOCUMENTS

AU    2002331623 B2    3/2003
CN    107388888 A    11/2017
(Continued)

OTHER PUBLICATIONS

Machine Translation of CN-107860261-A Description, Oct. 2023, Espacenet, pp. 1-5 (Year: 2023).*

(Continued)

*Primary Examiner* — Christopher R Dandridge
*Assistant Examiner* — Kevin Edward Schwartz
(74) *Attorney, Agent, or Firm* — FINNEGAN, HENDERSON, FARABOW, GARRETT & DUNNER, L.L.P.

(57) ABSTRACT

A water gun or toy water gun for dispensing liquid is disclosed. The gun includes at least one liquid dispensing outlet and at least one chamber housing that defines at least one chamber for storing liquid to be dispensed through the liquid dispensing outlet. For replenishing with liquid in a fast and convenient manner, the chamber is designed to be substantially uniform in cross section. An opening through which the liquid may be received in the chamber is also substantially the same size as the cross-section of chamber. The gun includes a lid that is pivotally movable between a closed position in which at least a portion of the opening is concealed by the lid and an open position in which the at least a portion of the opening is revealed by the lid.

28 Claims, 5 Drawing Sheets

(58) Field of Classification Search
USPC .............................. 239/373; 222/79; 446/153
See application file for complete search history.

(56) References Cited

U.S. PATENT DOCUMENTS

| | | | | |
|---|---|---|---|---|
| 4,630,757 | A * | 12/1986 | Yano | F41B 9/0037 |
| | | | | 222/379 |
| 5,029,732 | A * | 7/1991 | Wong | F41B 9/0071 |
| | | | | 222/379 |
| 5,052,587 | A | 10/1991 | Graves | |
| 5,520,296 | A * | 5/1996 | Freed | B65D 55/16 |
| | | | | 215/206 |
| 5,598,590 | A | 2/1997 | Crawford et al. | |
| 5,865,344 | A * | 2/1999 | Nagel | F41B 9/0012 |
| | | | | 417/474 |
| 7,798,364 | B1 | 9/2010 | Eddins et al. | |
| 9,220,332 | B1 * | 12/2015 | DeVito | A45D 33/22 |
| 2003/0034358 | A1 * | 2/2003 | Ma | F41B 9/0018 |
| | | | | 222/401 |
| 2005/0229788 | A1 | 10/2005 | White | |
| 2006/0207999 | A1 * | 9/2006 | Jarret | F41B 9/00 |
| | | | | 222/79 |
| 2011/0186595 | A1 * | 8/2011 | Garces | F41B 9/0015 |
| | | | | 222/79 |
| 2013/0320038 | A1 | 12/2013 | Carty et al. | |
| 2016/0045056 | A1 | 2/2016 | Kent | |
| 2016/0227903 | A1 * | 8/2016 | Kang | A45D 40/22 |
| 2017/0233160 | A1 * | 8/2017 | Hudson | B65D 77/062 |
| | | | | 222/183 |
| 2019/0100370 | A1 * | 4/2019 | Kieling | B65D 81/3216 |
| 2019/0113302 | A1 * | 4/2019 | Dukoff | F41B 9/0018 |
| 2020/0179961 | A1 * | 6/2020 | Tanner | A01G 25/097 |

FOREIGN PATENT DOCUMENTS

| | | | | |
|---|---|---|---|---|
| CN | 107860261 | A * | 3/2018 | |
| CN | 207622605 | U | 7/2018 | |
| DE | 19501078 | A1 | 7/1995 | |
| DE | 19533801 | C1 | 1/1997 | |
| DE | 20 2010 004 253 | U1 | 7/2010 | |
| EP | 1169955 | A1 | 1/2002 | |
| EP | 2923 570 | A1 | 9/2015 | |
| GB | 2098078 | A * | 11/1982 | F41B 9/0037 |
| GB | 2145340 | A * | 3/1985 | F41B 9/0037 |
| WO | WO 2003/016158 | A1 | 2/2003 | |

OTHER PUBLICATIONS

Extended European Search Report in counterpart European Patent Application No. 23205490.8 dated Jan. 29, 2024, (9 pages).
Extended European Search Report in counterpart European Patent Application No. 23205481.7 dated Jan. 29, 2024, (9 pages).
Examination Report from Australian Patent Application No. 2024100014 dated May 7, 2024 (six pages).
Examination Report from New Zealand Patent Application No. 780052 dated May 16, 2024 (five pages).
Zuru X-Shot Fast Fill!, Retrieved from <https://www.youtube.com/watch?v=KPKFwfvOUZI>.
Zuru X-Shot Water Warfare Fast Fill Soaker Assorted, Retrieved from <https://web.archive.org/web/20181130031435/https:/www.thewarehouse.co.nz/c/toys-baby/outdoor-play>.

* cited by examiner

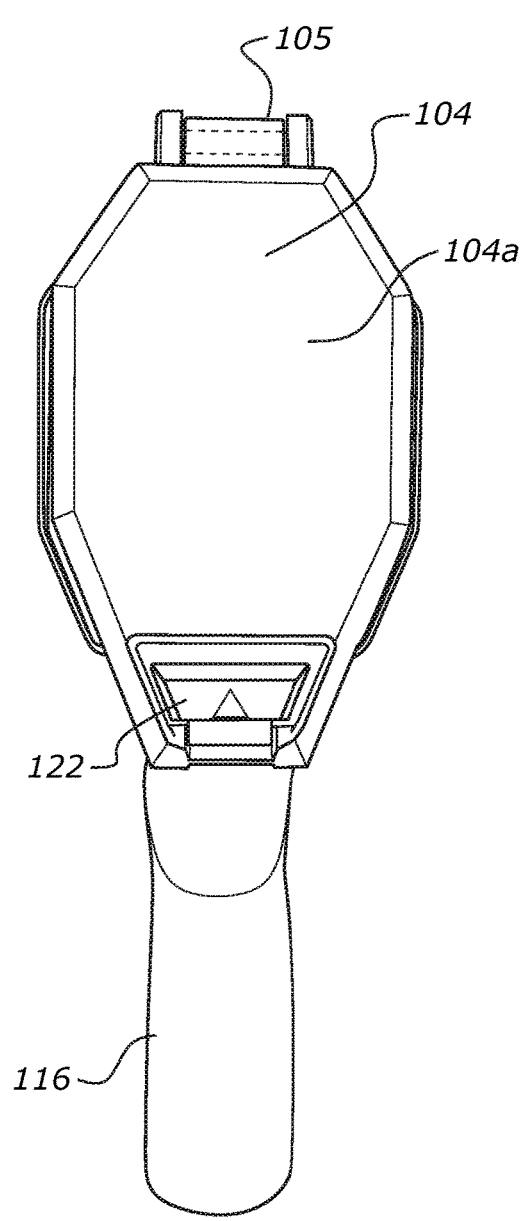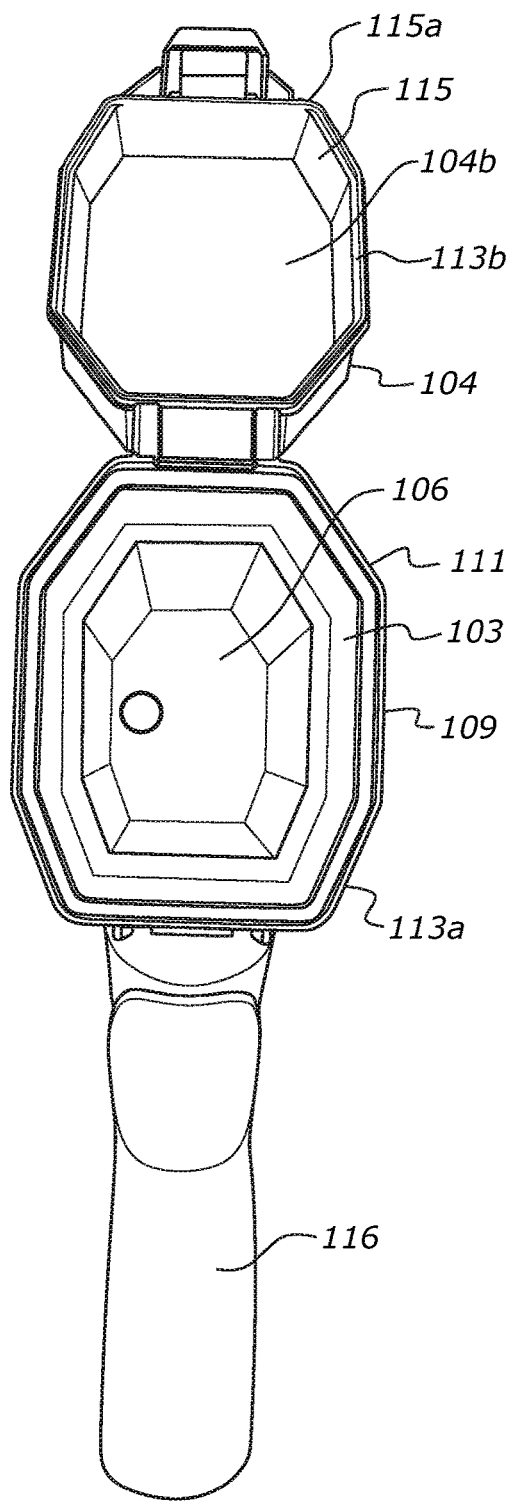
FIGURE 3
FIGURE 4

LIQUID DISPENSING APPARATUS

This application is a National Stage Application of International Application No. PCT/IB2019/051872, filed on Mar. 8, 2019, which is hereby incorporated by reference in its entirety for all purposes as if fully set forth herein.

The present invention relates to a liquid dispensing apparatus. More particularly but not exclusively it relates to a liquid dispensing apparatus such as a water gun or a toy water gun that is configured to dispense pressurised liquid such as water for recreational purposes.

BACKGROUND TO THE INVENTION

Several types of apparatuses for dispensing liquid, particularly pressurised liquid, are known such as but not limited to a gardening equipment for watering plants, equipment for replenishing containers (or balloons) with liquid, recreational equipment such as water guns etc.

Water guns are usually popular especially among children and the primary purpose of such apparatus is to soak another person in a water gun fight.

Apparatuses such as water guns are generally activated by manual pumping action through a trigger or similar actuating mechanism. This causes the water to stream directly of out the gun. Some also utilise the pressure difference between the reservoir of liquid in the gun and the pressure of the ambient air in order to activate. By creating pressure in the reservoir water can stream out under pressure when it is allowed to escape from the apparatus.

Replenishing such apparatus with water can be a time-consuming task and in many cases can be inconvenient too. For example, if the apparatus is a water gun to be used in a water gun fight, it is desirable for the water gun be replenished quickly so that a player can resume firing the water gun at others.

Previously known apparatuses of such types do not allow replenishing with liquid easily or quickly through a stream of flowing liquid such as from a water tap. Such a water gun has a small hole or opening via which water can be poured. An example is shown in U.S. Pat. No. 5,052,587

CN10738888A shows an example of a water gun capable of being replenished quickly. That publication discloses a water gun with a water refilling opening at the front side comprising magnetic force valves that can be opened and closed after the pressure is applied or released. However, such magnetic valve not only adds to the complexity of overall design but it would also mean that the water will still need to pass/drain through the components of such valve before passing or draining to the water reservoir of the gun. Consequently, that would mean that the replenishing is still not quick. Moreover, since the water refilling opening as well as the dispensing outlet (shooting hole) are both located on the front side of the water gun, once replenished it may then be necessary to then change the direction of the water gun to ensure that the dispensing outlet faces away from the user. This could be a further time-consuming exercise for the user and can also be inconvenient. In some cases, it could also add difficulty for replenishing and operating of the water gun using one hand only and may require both hands for use.

Further, as mentioned above, previously known apparatuses can require both hands for guiding the liquid into the apparatus to replenish it and for dispensing the liquid from the apparatus.

OBJECT OF THE INVENTION

It is an object of the present invention to provide an apparatus for dispensing liquid which overcomes or at least partially ameliorates at least some of the abovementioned disadvantages or which at least provides the public with a useful choice.

STATEMENTS OF THE INVENTION

In a first aspect, the invention resides in an apparatus for dispensing liquid, the apparatus comprising at least one chamber defined by a chamber housing extending between a first end region and a second end region, the at least one chamber being of same or substantially the same in cross section and extending from the first end region towards the second end region, the at least one chamber comprising:
  an opening at the first end region of the chamber housing through which the liquid is to be received in the chamber; and
  a lid located proximal to the opening and adapted to be pivotally move relative the chamber between a closed position in which at least a portion (and preferably all) of the opening is concealed by the lid and an open position in which at least the portion (and preferably all) of the opening is revealed by the lid;
  the opening being of same or substantially the same size as the cross-section of the at least one chamber,
  the apparatus further comprising at least one liquid dispensing outlet through which the liquid is adapted to be dispensed during use.

In one embodiment, the liquid is (or comprises) water.

In one embodiment, the apparatus is a handheld apparatus.

In one embodiment, the apparatus is the water gun (toy water gun).

In one embodiment, the chamber housing extends longitudinally from a first end region to a second end region, the first end region being proximal to the lid and the second end region being distal from the lid.

In one embodiment, the at least one chamber extends longitudinally from or near the first end region towards the second end region.

In one embodiment, the at least one chamber is of a cross section that is substantially constant along its length or a direction to which the chamber extends.

In one embodiment, the at least one chamber is of a cross section that is substantially constant in size along its length or a direction to which the at least one chamber extends.

In one embodiment, the opening is of a size substantially the same as the cross-sectional size of the at least one chamber the cross section taken as a plane to which a longitudinal direction of the chamber (or a direction to which the chamber extends) is normal to.

In one embodiment, the chamber extends at least 50% of the total length of the chamber housing.

In one embodiment, the chamber housing is approximately 35 cm in length.

In one embodiment the chamber is at least about 6 cm high and about 5 cm wide.

In one embodiment the chamber is about 8 cm high and about 7 cm wide.

In one embodiment, the at least one liquid dispensing outlet is located in the chamber housing.

In one embodiment, the at least one liquid dispensing outlet is located in the second end region of the chamber housing.

In one embodiment, the lid is adapted to be move between a closed position in which the opening is fully concealed by the lid and an open position in which the opening is fully revealed by the lid.

In one embodiment, the at least one chamber is octagonal or substantially octagonal in cross-section.

In one embodiment, the at least one chamber extends longitudinally and has a length of approximately 25 cm.

In one embodiment, the volume of the at least one chamber is approximately 700 ml.

In one embodiment, the lid is hinged to a portion of the chamber housing and configured to pivotally move between the open position and the closed position.

In one embodiment, the lid comprises a locking mechanism that is configured to lock the lid to the chamber housing and unlock the lid from the chamber housing when the lid is in the closed position.

In one embodiment, the locking mechanism comprises a lever (or pawl) with at least one tooth that is configured to engage with a complementary feature on the chamber housing to lock the lid to the chamber housing and disengage from a complementary surface on the chamber housing to unlock the lid from the chamber housing.

In one embodiment, the lever (or pawl) is configured to move to a position that allows the at least one tooth of the lever (or pawl) to engage in a snap-fit arrangement with the complementary surface on the chamber housing to lock the lid to the chamber housing when the lid is in the closed position.

In one embodiment, the chamber housing comprises a seal at or near a perimeter of the first end region of the chamber housing.

In one embodiment, a shape of the seal is same or substantially the same as the shape of the at least one chamber in cross-section.

In one embodiment, the seal is same size or of substantially the size as the perimeter of the first end region of the chamber housing.

In one embodiment, the seal comprises a channel (groove) that is configured to sealingly engage with a complementary protrusion located at the lid when the lid is in the closed position.

In one embodiment, the lid comprises an internal portion or an external portion, a wall extending around the internal portion of the lid, the complementary protrusion in being located at an edge of the wall that is distal from the internal portion of the lid.

In one embodiment, the lid comprises a plurality of protrusions or ribs in the external portion and/or the internal portion of the lid.

In one embodiment, the apparatus (or at least a part of the apparatus) is made out of plastic (or similar polymeric material).

In one embodiment, the apparatus comprises a handle portion located below the chamber housing, the handle portion being mounted to or integrally formed with the chamber housing.

In one embodiment, handle portion is proximal to the first end region of the chamber housing.

In one embodiment, the handle portion comprises a gripping portion (preferably formed on the handle portion) extending downwardly from the handle portion, the gripping portion adapted to facilitate gripping by a user's hand.

In one embodiment, the gripping portion is angled with respect to the chamber housing.

In one embodiment, the gripping portion is angled with respect to the chamber housing towards the lid.

In one embodiment, the gripping portion is angled between about 110 degrees to about 130 degrees from the chamber housing towards the lid.

In one embodiment, the apparatus comprises an actuator which when actuated is configured to inject air pressure inside the chamber to pump the liquid from the chamber through the at least one liquid dispensing outlet, during use.

In one embodiment, the actuator when actuated is configured to cause the apparatus to exert air pressure on any liquid stored inside the chamber greater than ambient air so that the liquid is dispensed under pressure through the at least one dispensing outlet, during use.

In one embodiment, the actuator is a slider which when slid between two locations.

In one embodiment the slider is adapted to slide from a location that is proximal to the liquid dispensing outlet to the location that is distal from the liquid dispensing outlet and vice-versa.

In one embodiment, the apparatus comprises a rail that is located below the chamber housing along which the slider is adapted to slide.

In one embodiment, the rail comprises one or more channels and the slider is adapted to slidingly engage with the one or more channels in order to slide along the rail.

In one embodiment, the rail is parallel or substantially parallel with the chamber housing.

In one embodiment, the one or more channels of the rail is/are parallel or substantially parallel with the chamber housing.

In one embodiment, the rail and the handle portions are integrally formed.

In a second aspect, the invention resides in a water gun (toy water gun) comprising:
- at least one liquid dispensing outlet;
- at least one chamber housing defining at least one chamber for storing liquid to be dispensed through the liquid dispensing outlet; and
- the chamber extending from a first end region towards a second end region of the chamber housing, the chamber being of same or substantially the same in cross section, the chamber comprising:
- an opening at the first end region of the chamber through which the liquid is adapted to be received inside the chamber; and the opening being of same or substantially the same size as the cross-section of chamber;

wherein, the water gun further comprises a lid that is pivotally movable relative the chamber between a closed position in which at least a portion of the opening is concealed by the lid and an open position in which the at least a portion of the opening is revealed by the lid.

In one embodiment, the liquid is (or comprises) water.

In one embodiment, the chamber housing extends longitudinally from a first end region to a second end region, the first end region being proximal to the lid and the second end region being distal from the lid.

In one embodiment, the at least one chamber extends longitudinally from or near the first end region towards the second end region.

In one embodiment, the at least one chamber is of a cross section that is substantially constant along its length or a direction to which the chamber extends.

In one embodiment, the at least one chamber is of a cross section that is substantially constant in size along its length or a direction to which the at least one chamber extends.

In one embodiment, the opening is of a size substantially the same as the cross-sectional size of the at least one chamber the cross section taken as a plane to which a longitudinal direction of the chamber (or a direction to which the chamber extends) is normal to.

In one embodiment, the chamber extends at least 50% of the total length of the chamber housing.

In one embodiment, the chamber housing is approximately 35 cm in length.

In one embodiment the chamber is at least about 6 cm high and about 5 cm wide.

In one embodiment the chamber is about 8 cm high and about 7 cm wide.

In one embodiment, the liquid dispensing outlet is located in the second end region of the chamber housing.

In one embodiment, a lid is adapted to be move between a closed position in which the opening is fully concealed by the lid and an open position in which the opening is fully revealed by the lid.

In one embodiment, the at least one chamber is octagonal or substantially octagonal in cross-section.

In one embodiment, the at least one chamber has a length of approximately 25 cm from the first end region to the second end region of the chamber.

In one embodiment, the volume of the at least one chamber is approximately 700 ml.

In one embodiment, the lid is hinged to a portion of the chamber housing and configured to pivotally move between the open position and the closed position.

In one embodiment, the lid comprises a locking mechanism that is configured to lock the lid to the chamber housing and unlock the lid from the chamber housing when the lid is in the closed position.

In one embodiment, the locking mechanism comprises a lever (or pawl) with at least one tooth that is configured to engage with a complementary feature on the chamber housing to lock the lid to the chamber housing and disengage from a complementary surface on the chamber housing to unlock the lid from the chamber housing.

In one embodiment, the lever (or pawl) is configured to move to a position that allows the at least one tooth of the lever (or pawl) to engage in a snap-fit arrangement with the complementary surface on the chamber housing to lock the lid to the chamber housing when the lid is in the closed position.

In one embodiment, the chamber housing comprises a seal at or near a perimeter of an end region of the chamber housing that is proximal to the lid (i.e. the first end region of the chamber housing).

In one embodiment, a shape of the seal is same or substantially the same as the shape of the at least one chamber in cross-section.

In one embodiment, the seal is same size or of substantially the size as the perimeter of an end region of the chamber housing that is proximal to the lid (i.e. the first end region of the chamber housing).

In one embodiment, the seal comprises a channel (groove) that is configured to sealingly engage with a complementary protrusion located at the lid when the lid is in the closed position.

In one embodiment, the lid comprises an internal portion or an external portion, a wall extending around the internal portion of the lid, the complementary protrusion in being located at an edge of the wall that is distal from the internal portion of the lid.

In one embodiment, the lid comprises plurality of protrusions or ribs in the external portion and/or the internal portion of the lid.

In one embodiment, the water gun (or at least a part of the water gun) is made out of plastic (or similar polymeric material).

In one embodiment, the water gun comprises a handle portion located below the chamber housing, the handle portion being mounted to or integrally formed with the chamber housing.

In one embodiment, handle portion is proximal to the first end region of the chamber housing.

In one embodiment, the handle portion comprises a gripping portion (preferably formed on the handle portion) extending downwardly from the handle portion, the gripping portion adapted to facilitate gripping by a user's hand.

In one embodiment, the gripping portion is angled with respect to the chamber housing.

In one embodiment, the gripping portion is angled with respect to the chamber housing towards the lid.

In one embodiment, the gripping portion is angled between about 100 degrees to about 130 degrees from the chamber housing towards the lid.

In one embodiment, the apparatus comprises an actuator which when actuated is configured to is configured to inject air pressure inside the chamber to pump the liquid from the chamber through the at least one liquid dispensing outlet, during use.

In one embodiment, the actuator when actuated is configured to cause the apparatus to exert air pressure on any liquid stored inside the chamber greater than ambient air so that the liquid is dispensed under pressure through the at least one liquid dispensing outlet, during use.

In one embodiment, the actuator is a slider which when slid between two locations.

In one embodiment the slider is adapted to slide from a location that is proximal to the liquid dispensing outlet to the location that is distal from the liquid dispensing outlet and vice-versa.

In one embodiment, the water gun comprises a rail that is located below the chamber housing along which the slider is adapted to slide.

In one embodiment, the rail comprises one or more channels and the slider is adapted to slidingly engage with the one or more channels in order to slide along the rail.

In one embodiment, the rail is parallel or substantially parallel with the chamber housing.

In one embodiment, the one or more channels of the rail is/are parallel or substantially parallel with the chamber housing.

In one embodiment, the rail and the handle portions are integrally formed.

In a third aspect, the invention resides in a water gun (toy water gun) comprising:

the water gun comprising at least one liquid dispensing outlet;

at least one chamber housing defining at least one chamber for storing liquid to be dispensed through the liquid dispensing outlet;

the chamber housing extending longitudinally from a first end region that is at or near a rear end of the apparatus to a second end that at or near a front end of the apparatus;

the chamber with a uniform or substantially uniform cross-section formed inside the chamber housing and extending longitudinally from or near the first end region towards the second end region with the opening of the chamber being located at the second end region;

wherein, the water gun comprises a lid that is pivotally movable relative the chamber between a closed position in which at least a portion of the opening is concealed by the lid and an open position in which the at least a portion of the opening is revealed by the lid.

In one embodiment, the liquid dispensing outlet is located at the first end region.

In one embodiment, the liquid is (or comprises) water.

In one embodiment, the at least one chamber is of a cross section that is substantially constant along its length or a direction to which the chamber extends.

In one embodiment, the at least one chamber is of a cross section that is substantially constant in size along its length or a direction to which the at least one chamber extends.

In one embodiment, the opening is of a size substantially the same as the cross-sectional size of the at least one chamber the cross section taken as a plane to which a longitudinal direction of the chamber (or a direction to which the chamber extends) is normal to.

In one embodiment, the chamber extends at least 50% of the total length of the chamber housing.

In one embodiment, the chamber housing is approximately 35 cm in length.

In one embodiment the chamber is at least about 6 cm high and about 5 cm wide. In one embodiment the chamber is about 8 cm high and about 7 cm wide.

In one embodiment, the liquid dispensing outlet is located in the second end region of the chamber housing.

In one embodiment, a lid is adapted to be move between a closed position in which the opening is fully concealed by the lid and an open position in which the opening is fully revealed by the lid.

In one embodiment, the at least one chamber is octagonal or substantially octagonal in cross-section.

In one embodiment, the at least one chamber is longitudinal and has a length of approximately 25 cm.

In one embodiment, the volume of the at least one chamber is approximately 700 ml.

In one embodiment, the lid is hinged to a portion of the chamber housing and configured to pivotally move between the open position and the closed position.

In one embodiment, the lid comprises a locking mechanism that is configured to lock the lid to the chamber housing and unlock the lid from the chamber housing when the lid is in the closed position.

In one embodiment, the locking mechanism comprises a lever (or pawl) with at least one tooth that is configured to engage with a complementary feature on the chamber housing to lock the lid to the chamber housing and disengage from a complementary surface on the chamber housing to unlock the lid from the chamber housing.

In one embodiment, the lever (or pawl) is configured to move to a position that allows the at least one tooth of the lever (or pawl) to engage in a snap-fit arrangement with the complementary surface on the chamber housing to lock the lid to the chamber housing when the lid is in the closed position.

In one embodiment, the chamber housing comprises a seal at or near a perimeter of an end region of the chamber housing that is proximal to the lid (i.e. the first end region of the chamber housing).

In one embodiment, a shape of the seal is same or substantially the same as the shape of the at least one chamber in cross-section.

In one embodiment, the seal is same size or of substantially the size as the perimeter of an end region of the chamber housing that is proximal to the lid (i.e. the first end region of the chamber housing).

In one embodiment, the seal comprises a channel (groove) that is configured to sealingly engage with a complementary protrusion located at the lid when the lid is in the closed position.

In one embodiment, the lid comprises an internal portion or an external portion, a wall extending around the internal portion of the lid, the complementary protrusion in being located at an edge of the wall that is distal from the internal portion of the lid.

In one embodiment, the lid comprises a plurality of protrusions or ribs in the external portion and/or the internal portion of the lid.

In one embodiment, the water gun (or at least a part of the water gun) is made out of plastic (or similar polymeric material).

In one embodiment, the water gun comprises a handle portion located below the chamber housing, the handle portion being mounted to or integrally formed with the chamber housing.

In one embodiment, handle portion is proximal to the first end region of the chamber housing.

In one embodiment, the handle portion comprises a gripping portion (preferably formed on the handle portion) extending downwardly from the handle portion, the gripping portion adapted to facilitate gripping by a user's hand.

In one embodiment, the gripping portion is angled with respect to the chamber housing.

In one embodiment, the gripping portion is angled with respect to the chamber housing towards the lid.

In one embodiment, the gripping portion is angled between about 100 degrees to about 130 degrees from the chamber housing towards the lid.

In one embodiment, the apparatus comprises an actuator which when actuated is configured to is configured to inject air pressure inside the chamber to pump the liquid from the chamber through the at least one liquid dispensing outlet, during use.

In one embodiment, the actuator when actuated is configured to cause the apparatus to exert air pressure on any liquid stored inside the chamber greater than the ambient air so that the liquid is dispensed under pressure through the at least one dispensing outlet, during use.

In one embodiment, the actuator is a slider which when slid between two locations.

In one embodiment the slider is adapted to slide from a location that is proximal to the liquid dispensing outlet to the location that is distal from the liquid dispensing outlet and vice-versa.

In one embodiment, the water gun comprises a rail that is located below the chamber housing along which the slider is adapted to slide.

In one embodiment, the rail comprises one or more channels and the slider is adapted to slidingly engage with the one or more channels in order to slide along the rail.

In one embodiment, the rail is parallel or substantially parallel with the chamber housing.

In one embodiment, the one or more channels of the rail is/are parallel or substantially parallel with the chamber housing.

In one embodiment, the rail and the handle portions are integrally formed.

In a fourth aspect the present invention may broadly be said to be a toy water gun comprising a body having a front at where water can stream from the toy water gun through a liquid dispensing outlet and a back at region of the body opposite the front, the body including a chamber to retain water that can be caused to stream from the toy watergun the chamber being elongate and extending between the front and back and including an opening via which water can pass to replenish the chamber with water.

In one embodiment, the opening is presented in a direction facing in a backward direction of the body.

In one embodiment, the chamber is of a cross section that is substantially constant along its length.

In one embodiment, the opening is of a size substantially the same as the cross-sectional size of the chamber the cross section taken as a plane to which the elongate direction of the chamber (or a direction to which the chamber extends) is normal to.

In one embodiment, the body of the gun is of a shape and configuration that is less resistant to movement in water in a direction parallel the elongate direction of the chamber compared to a direction perpendicular to the elongate direction.

In one embodiment, the body is of a shape and configuration that makes the elongate direction length of the gun the largest of the orthogonal direction lengths.

In one embodiment, the body includes a pistol grip near the back of the body.

In one embodiment, the chamber is replenished with water by moving the gun through a body of water with the back leading the front in the moving direction.

In one embodiment, the body is adapted and configured to present the opening so that the chamber is replenished with water by moving the gun through a body of water with the back leading the front in the moving direction to cause water flow into the chamber via the opening.

In one embodiment, the body is adapted and configured to present the opening so that the chamber is replenished with water by moving the gun through a body of water with the back leading the front in the moving direction to accelerate water flow into the chamber via the opening when compared to allowing water to drain into the chamber if the gun was not moving through the body of water.

In one embodiment, opening is at least from and including 3 $cm^2$ to and including at least 80 $cm^2$ in area.

In one embodiment, the area of the opening is at least 3 $cm^2$.

In one embodiment, the area of the opening is at least 4 $cm^2$.

In one embodiment, the area of the area of the opening is at least 5 $cm^2$.

In one embodiment, the area of the opening is at least 6 $cm^2$.

In one embodiment, the area of the opening is at least 7 $cm^2$.

In one embodiment, the area of the opening is at least 8 $cm^2$.

In one embodiment, the area of the opening is at least 9 $cm^2$.

In one embodiment, the area of the opening is at least 10 $cm^2$.

In one embodiment, the area of the opening is at least 15 $cm^2$.

In one embodiment, the area of the opening is at least 20 $cm^2$.

In one embodiment, the area of the opening is at least 25 $cm^2$.

In one embodiment, the area of the opening is at least 30 $cm^2$.

In one embodiment, the area of the opening is at least 35 $cm^2$.

In one embodiment, the area of the opening is at least 40 $cm^2$.

In one embodiment, the area of the opening is at least 50 $cm^2$.

In one embodiment, the area of the opening is at least 60 $cm^2$.

In one embodiment, the area of the opening is at least 70 $cm^2$.

In one embodiment, the area of the opening is at least 80 $cm^2$.

In one embodiment, the area of the opening is at least 90 $cm^2$.

In one embodiment, the area of the opening is at least 100 $cm^2$.

In one embodiment, the area of the opening is at least 120 $cm^2$.

In one embodiment, the area of the opening is approximately 25 $cm^2$.

In one embodiment, the area of the opening is approximately 30 $cm^2$.

In one embodiment, the area of the opening is approximately 35 $cm^2$.

In one embodiment, the area of the opening is approximately 40 $cm^2$.

In one embodiment, the area of the opening is approximately 50 $cm^2$.

In one embodiment, the area of the opening is approximately 60 $cm^2$.

In one embodiment, the area of the opening is approximately 70 $cm^2$.

In one embodiment, the area of the opening is approximately 80 $cm^2$.

In one embodiment, the area of the opening is approximately 90 $cm^2$.

In one embodiment, the area of the opening is approximately 100 $cm^2$.

In one embodiment, the area of the opening is approximately 120 $cm^2$.

In a fourth aspect, the invention resides in a method of operating the liquid dispensing apparatus or water gun as defined in any one of the above aspects, the method comprising the following steps:

providing the apparatus or the water gun as defined in any one of the above statements, replenishing the chamber of the apparatus or the water gun with a liquid;

dispensing the liquid from the chamber through the at least one liquid dispensing outlet of the apparatus or the water gun.

In one embodiment, the step of replenishing the chamber of the apparatus or the water gun with a liquid comprises:

moving any lid concealing the opening from a closed position to an open position;

dipping the apparatus or the water gun inside the pool of liquid so that the opening or at least part of the opening is below the surface of the liquid;

pulling the apparatus or water gun from the pool of liquid.

In one embodiment, the step of replenishing the chamber of the apparatus or the water gun with a liquid further comprises:

moving any lid revealing the opening from the open position to the closed position after pulling the apparatus or water gun from the pool of liquid.

In one embodiment, the liquid dispensing apparatus or the water gun is operated using one hand only.

In a fifth aspect, the invention resides in a use of the liquid dispensing apparatus or water gun as defined in any one of the above aspects.

Other aspects of the invention may become apparent from the following description which is given by way of example only and with reference to the accompanying drawings.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following description are simply exemplary embodiments of the invention. Hence, specific dimensions and other physical characteristics related to the embodiments disclosed herein are not to be considered as limiting.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprises' or 'comprised' or 'comprising' is used in relation to the apparatus or to one or more steps in a method or process.

As used hereinbefore and hereinafter, the term "and/or" means "and" or "or", or both.

As used hereinbefore and hereinafter, "(s)" following a noun means the plural and/or singular forms of the noun.

As used hereinbefore and hereinafter and unless otherwise stated, the phrase "first end region" can also mean "first end portion" or "first end". Similarly, unless otherwise stated, the phrase "second end region" can also mean "second end portion" or "second end".

When used in claim and/or the statements of the invention and unless stated otherwise, the word 'for' is to be interpreted to mean only 'suitable for', and not for example, specifically 'adapted' or 'configured' for the purpose that is stated.

Unless stated otherwise, the steps recited in any of the method or process descriptions may be executed in any suitable order and are not necessarily limited to the order presented.

BRIEF DESCRIPTION OF THE DRAWINGS

The invention will now be described by way of example only and with reference to the drawings in which:

FIG. 3: shows a rear plan view of the apparatus of FIG. 1 with the lid in closed position.

FIG. 4: shows a rear plan view of the apparatus of FIG. 1 with the lid in closed position.

DETAILED DESCRIPTION

Figure 1:
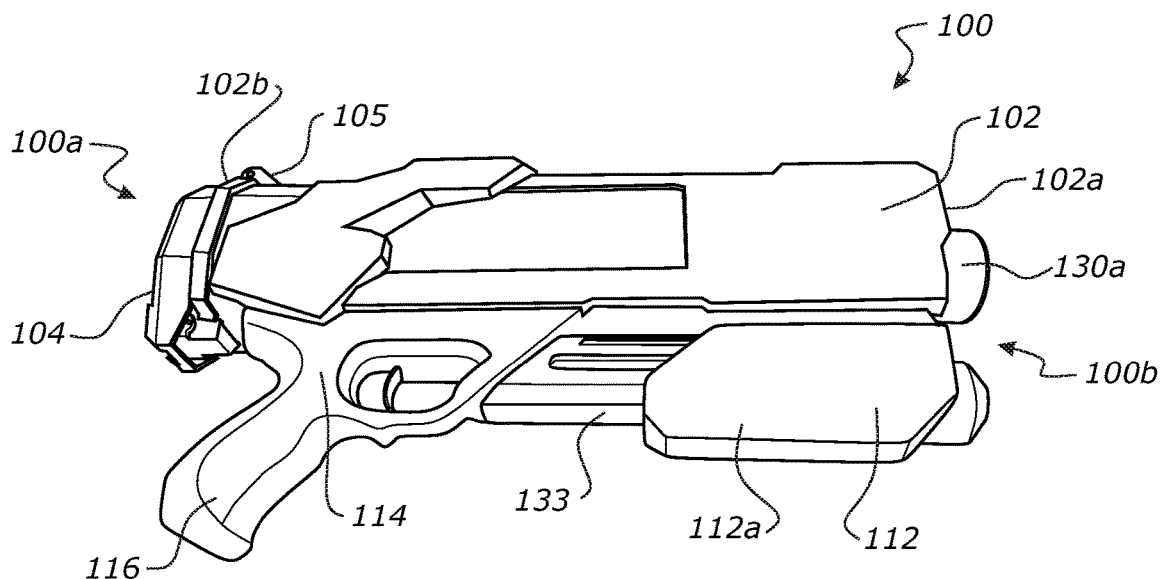
FIG. 1: shows a side elevation view of an apparatus according to one preferred embodiment of the present invention.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not of limitation.

Reference will now be made to FIGS. 1 to 5 which show a side elevation view of a liquid dispensing apparatus 100 according to one preferred example of the present invention. The apparatus 100 is preferably a toy in the form of a water gun.

The apparatus 100 when in the form of a gun has generally two end regions 100a and 100b. The ends regions 100a, 100b also represents at the front and rear/back of the gun. In other words, the end region 100b is at the firing end of the barrel of the gun (rear/back) and the end region 100a is at the opposite end (front).

As shown, the apparatus 100 may comprise a chamber 106 (see FIG. 4) extending between the two end regions 100a, 100b of the apparatus 100. It preferably extends from one end region 100a (rear/back to the apparatus) to or towards the other end region 100b (front of the apparatus). The chamber 106 may be defined by a chamber housing 102, i.e. the chamber 106 is preferably hence located inside the chamber housing 102.

The chamber 106 is preferably of an elongate nature extending between the end regions 100a, 100b of the gun/apparatus 100.

In the example of the gun/apparatus 100 shown, a first end region 102a and the second end region 102b of the chamber housing 102 defines the chamber 106 and are shown to be located opposite to each other. Although, only one chamber 106 is shown and is preferred due to simplicity of design from both the manufacturers as well as user's perspective, the apparatus 100 may comprise more than one chambers where each chamber may be located inside an independent chamber housing. Alternatively, a plurality of chambers may be located inside a single chamber housing.

The chamber 106 may comprise an opening 103 at the first end region 102a. The opening 103 may be suitable for receiving a liquid such as water or a liquid comprising water. In other words, the liquid such as water may be received from the chamber 106 through the opening 103.

Figure 2:
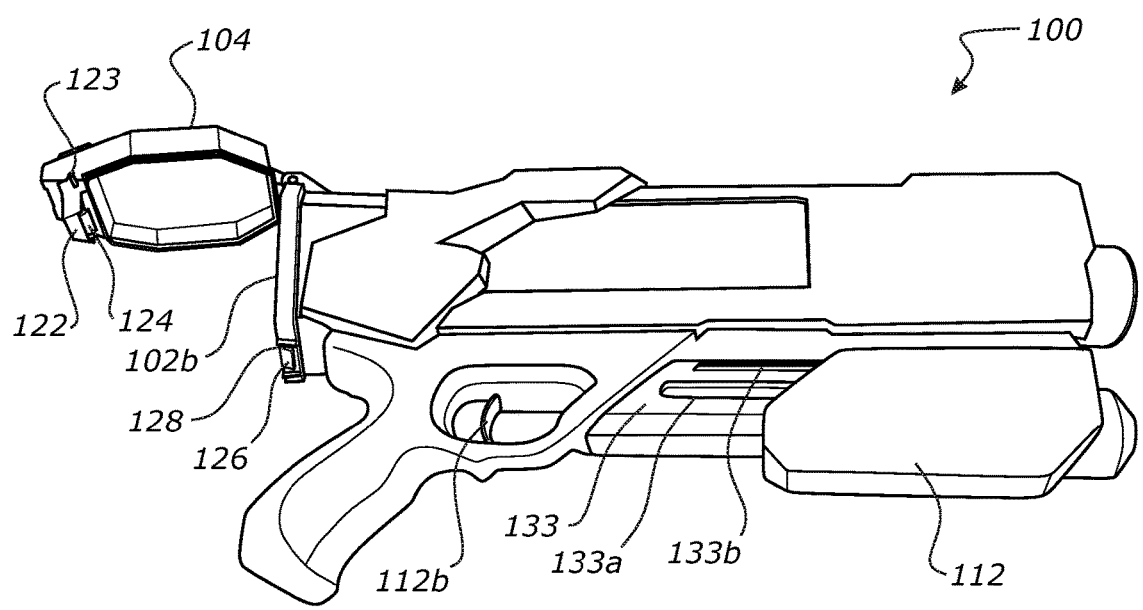
FIG. 2: shows the side elevation view of the apparatus of FIG. 1 with a lid in open position.
Figure 5:
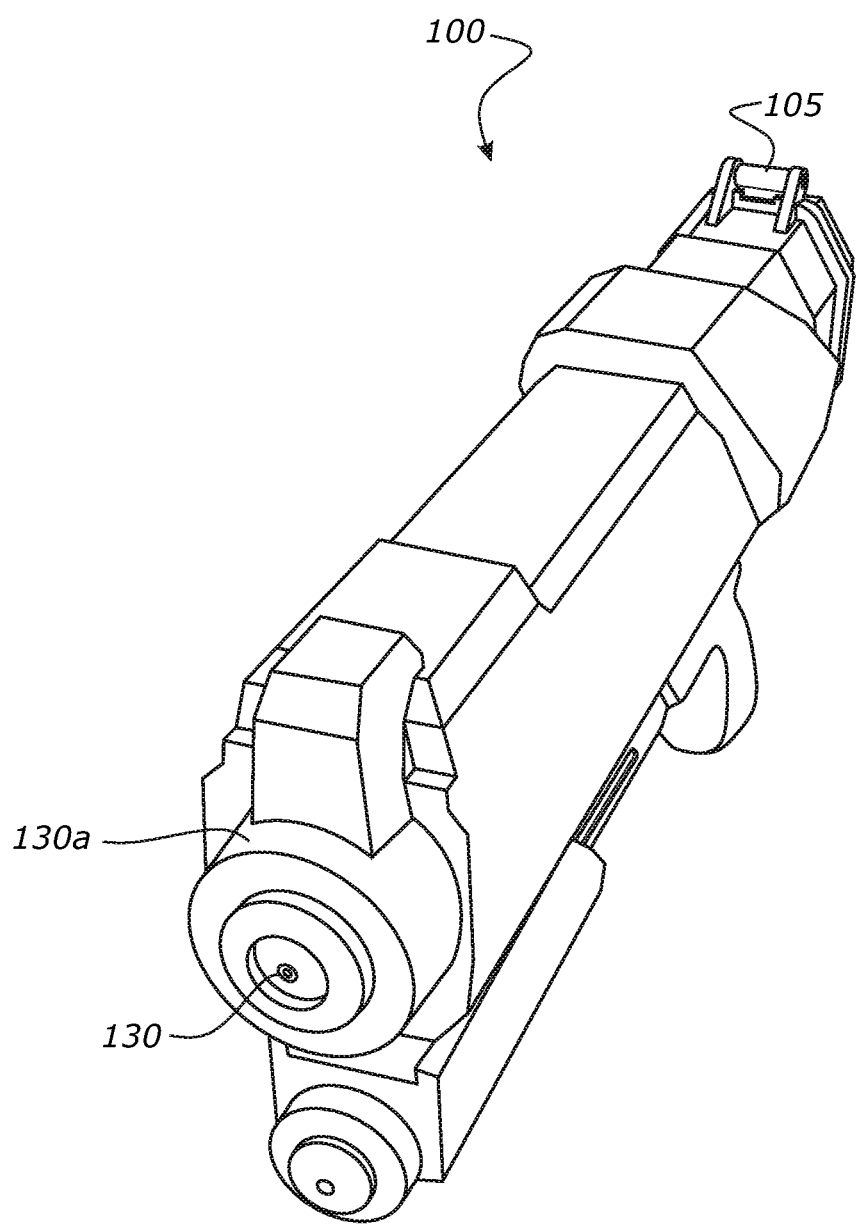
FIG. 5: shows a top perspective view of the apparatus of FIG. 1 with the lid in closed position.

The lid 104 may be pivotally movable relative the chamber 106 between a closed position as shown in FIGS. 1, 3 and 5 in which the opening 103 may be partially or fully concealed by the lid and an open position as shown in FIGS. 1 and 4 in which the opening 103 is partially or fully revealed by the lid 104 as shown in FIGS. 2 and 4.

As shown, the opening 104 may be of same or substantially the same size and shape as the cross-section (the cross section being in an orientation so that the elongate direction or the direction to which the chamber extends is normal to the plane of the cross section) of the chamber 106.

The chamber 106 may be octagonal or substantially octagonal in cross-section as shown. However, it is possible that the chamber 106 is of many other shapes in cross-section such as but not limited to circular, square, rectangular or any other suitable polygonal shape.

The chamber 106 may extend longitudinally and have a length of approximately 25. The volume of the chamber may be 700 ml or approximately 700 ml, i.e. it may hold 700 ml or approximately 700 ml of liquid.

The chamber housing 102 may extend (longitudinally extend) between a first end region 102a and the second end region 102b. The first end region 102a may be proximal to a lid 104 for the chamber 106 and the second end region 102b may be distal from the lid 104. In the embodiment shown, the first end region 102a of the chamber housing 102 is at or proximal to the back/rear of the apparatus 100 which is the end region 100a and the second end region 102b of the chamber housing 102 is at or proximal to the front of the apparatus which is the end region 102b.

The chamber 106 may be an elongated chamber. The chamber 106 may extend longitudinally from or near the first end region 102a of the chamber housing 102 to or towards the second end region 102b of the chamber housing 102. However, it may be possible that the chamber is of many other suitable shapes including an L-shaped or a U-shaped. Although, having a chamber 106, that is elongated is most preferred at least because of the simplicity of construction. By having a chamber 106 that is elongated rather than L-shaped or U shaped may also mean that the liquid can be stored inside the chamber 106 at the same or substantially the same level and therefore can be easily dispensed from the apparatus 100 at a consistent flow rate or pressure.

The chamber 106 is preferably of the same or substantially the same cross section along its elongate length. In one embodiment, the chamber 106 is of a cross section that is substantially constant (i.e. constant in size) along its length or a direction to which the chamber 106 extends. The opening is preferably of a size substantially the same as the cross-sectional size of the chamber 106 the cross section taken as a plane to which a longitudinal direction of the chamber is normal to.

In one embodiment, the chamber 106 may extend at least 50% of the total length of the chamber housing 102. In one embodiment, the chamber housing 102 may be approximately 35 cm in length. In one embodiment the chamber 106 may be at least about 6 cm high and about 5 cm wide. In one embodiment the chamber 106 may be about 8 cm high and about 7 cm wide.

The apparatus 100 may comprise at least one liquid dispensing outlet 130 (see FIG. 5) through which the liquid is adapted to be dispensed. The liquid dispensing outlet 130 may be formed on a nozzle 130a. The nozzle 130a and/or the liquid dispensing outlet 130 may be located at the second end region 102b of the chamber housing 102.

In the embodiment shown, the lid 104 may be hinged to a portion of the chamber housing 102 and configured to pivotally move between the open position and the closed position relative the chamber. It may be possible that the lid 104 is removably mounted to the chamber housing 102 although having pivotally mounted lid is most preferable at least because it can prevent the lid 104 from being lost or misplaced. Similarly, due to such pivotal arrangement, the action of opening and closing of the lid 104 as well as well as holding the apparatus can be done by the user using a same hand.

An example of a locking mechanism of the lid 104 will now be described. The locking mechanism is configured to lock the lid 104 to the chamber housing 102 and unlock the lid 104 from the chamber housing 102 when the lid 104 is in the closed position.

As shown in FIG. 2, the locking mechanism may comprise a lever 122 (or pawl) with at least one tooth 124 that may be configured to engage with a complementary feature 126 on the chamber housing 102 to lock the lid 104 to the chamber housing 102. Similarly, the tooth 124 that may be configured to disengage with the complementary feature 126 on the chamber housing 102 to unlock the lid 104 from the chamber housing 102.

The lever 122 may be configured to allow the tooth of the lever 104 to snap-fit with the complementary surface 126 on the chamber housing 102 to lock the lid 104 to the chamber housing when the lid 104 is in the closed position. For example, the lever 122 may be constructed of a flexible/resilient material such as flexible moulded plastic so that when the lid is pivoted to the closed position and an external force is applied to the external surface lid, e.g. lid is pushed towards the direction of the opening 103 using user's fingers or hand, the tooth 124 of the lever 122 snap fits with the complementary surface 126 on the chamber housing 102 thereby locking the lid 104 to the chamber housing 102. Alternatively, due to such locking arrangement, the lid may locked to the chamber housing 102 simply by momentum of the lid without having to also manually push the lid towards the direction of the opening 103. A rapid motion of the gun, held in one hand by the user, can cause an open lid to flick to a closed and latched condition.

Applying external force to a lever 122 may cause the tooth 124 of the lever 122 to disengage with the complementary surface 126 on the chamber housing thereby unlocking the lid 104 from the chamber housing 102. Once unlocked, the lid 104 may be pivoted from the closed position to the open position.

Of course, a skilled person will appreciate that such snap fit arrangement can be achieved by many other means such as biasing the lever 122 to a particular position using suitable biasing means, e.g. spring.

Figure 8:
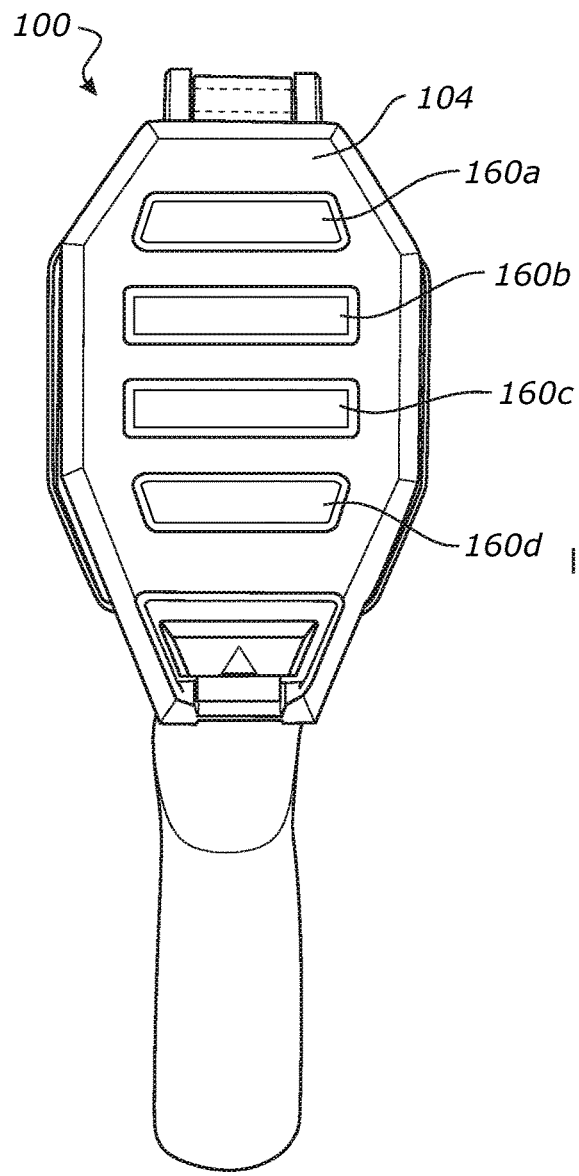
FIGS. 8 and 9: show one variation of an apparatus of FIG. 1 in which lid comprises plurality of ribs.
Figure 9:
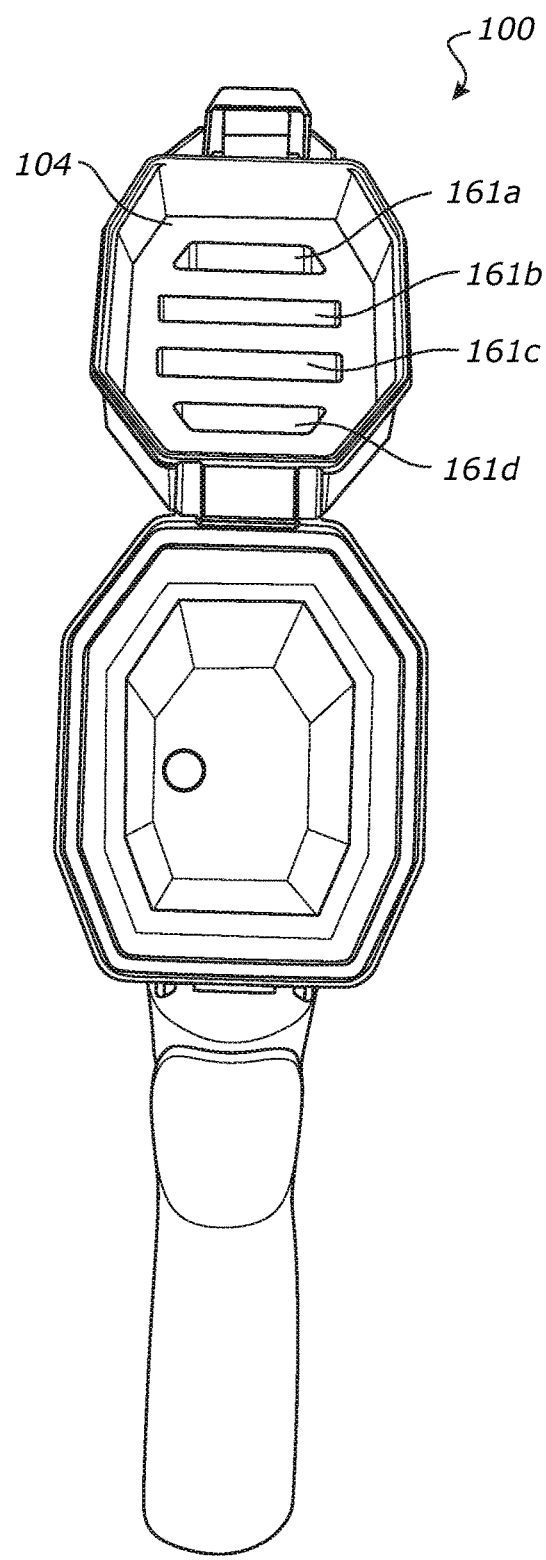

As shown, lid 104 may comprise an internal portion 104b that is configured to face the chamber 106 when the lid 104 is in closed position. The external portion 104a may be located on opposite side of the internal portion 104b. As shown in FIGS. 8 and 9, the lid 104 may comprise plurality of protrusions or ribs 160a, 1160b, 160c, 160d in the external portion 104a. There may be ribs 161a, 161b, 161c, 161d in internal portion 104b. These ribs 160a-d and 161b-161d may enhance the structural strength of the lid 104 can prevent easy breakage or deformation of the lid 104.

The chamber housing may comprise a seal 111 at or near the first end region 102a of the chamber housing 102a. Specifically, the seal 111 may be located at or near the perimeter 109 on an end of the chamber housing 102 that is proximal to the lid 102, i.e. on the first end region 102a. The shape of the seal 111 may be same or substantially the same as the shape of the chamber 106 in cross-section. In the embodiment as shown, the shape of the seal 111 as well as the chamber are both octagonal. The size of the seal may be same or substantially the as the size of the perimeter 109 on an end of the chamber housing that is proximal to the lid 102.

Figure 6:
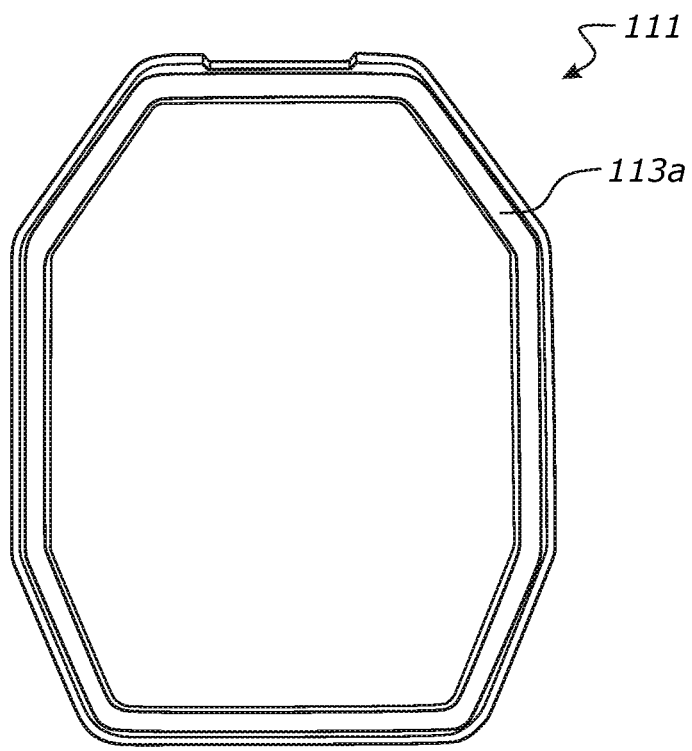
FIG. 6: shows a top plan view of the seal for use in the apparatus of FIG. 1.
Figure 7:
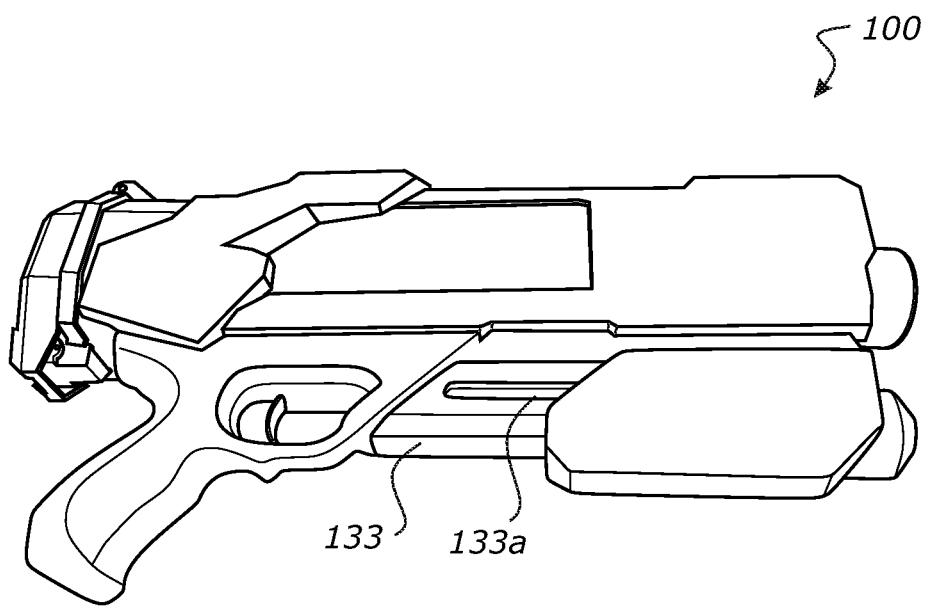
FIG. 7: shows one variation of an apparatus of FIG. 1 in which the rail comprises only one channel.

The seal 111 may comprise a channel or groove 113*a* (see FIG. 6) that is configured to sealingly engage with a complementary protrusion 113*b* located at the lid 104 when the lid 104 is in the closed position. The seal 111 may be made out of a rubber or silicon or many other suitable elastomeric or resilient material.

The internal portion of the lid 104 may comprise a wall 115 around the internal portion 104*b* of the lid 104. The complementary protrusion 113*b* may be located at an edge 115*a* of the wall 115*a* that is distal from the internal portion 104*b* of the lid 104.

The apparatus 100 (or at least a part of the apparatus 100) may be made out of plastic (or similar polymeric material).

The apparatus 100 may comprise a handle portion 114 located below the chamber housing 102. The handle portion 114 may be mounted to the chamber housing by a suitable mounting or fastening means (e.g. screws). Alternatively, the handle portion 114 may be integrally formed with the chamber housing 102.

As shown, the handle portion 114 may comprise a gripping portion 116. The gripping portion 116 may be preferably formed on the handle portion 114 and may extend downwardly from the handle portion 114. The gripping portion 116 may be adapted to facilitate gripping by the user's hand.

As shown the handle portion 114 and 116 may resemble that of a pistol or similar hand operated gun and the chamber housing 104 may resemble that of the barrel of such gun.

The gripping portion 116 may be angled with respect to the chamber housing 102, preferably towards the lid 104. The gripping portion may be angled between about 100 degrees to about 130 degrees from the chamber housing 112 towards the lid 104.

In one embodiment, the apparatus 100 may comprise an actuator 112 which when actuated can inject air pressure inside the chamber 106 to pump the liquid from the chamber 106 through the liquid dispensing outlet. Many suitable kind of pumping mechanisms that are already known in the art or may be known in the future may be incorporated in the apparatus 100. In one embodiment, the actuator 112 may be configured to cause the apparatus exert air pressure on any liquid stored inside the chamber 106 greater than ambient air so that the liquid stored inside the chamber 106 can be dispensed under pressure from the apparatus 100 through the dispensing outlet 130. Any suitable pumping mechanisms including those that are currently used in water guns for pumping and dispensing the liquid from may be used in the apparatus 100 of the present invention. The working principals of such pumping mechanisms will be clearly apparent to a person skilled in the art and therefore need not be defined in this specification.

As shown the actuator 112 may be a slider 112*a* which when slid between two locations may be adapted to pump the liquid from the chamber 106 through the liquid dispensing outlet 130. The slider 112*a* may be adapted to slide from a location that is proximal to the liquid dispensing outlet 130 to the location that is distal from the liquid dispensing outlet 130 and vice-versa.

The apparatus may comprise a rail 133 located below the chamber housing 102 along which the slider 112*a* is adapted to slide. The rail 113 may comprise one or more channels (channels may be grooves) 133*a*, 133*b* to which complementary features such as protrusions (not shown) located on the slider 112 may be adapted to slidingly engage thereby facilitating the slider to slide along the rail. The rails 133 (and the channels 113*a*, 113*b*) may be parallel or substantially parallel with the chamber housing 102. FIGS. 1 and 2 show rail 133 with two channels 133*a* and 133*b* whereas FIG. 5 shows the rail 133 with only one channel 133*a*.

As shown, the rail 133 and the handle portion 116 may be integrally formed.

In one embodiment, the trigger 112*b* may be used alternative or in addition to the slider to pump the liquid from the chamber 106 through the liquid dispensing outlet 130.

In one embodiment, the rail and the handle portions are integrally formed.

From the above it can be appreciated that the invention may lie in an apparatus 100 in the form a toy water gun comprising a body having a front (denoted by end region 100*a*) at where water can stream from the toy water gun through a liquid dispensing outlet 130 and a back (denoted by end region 100*b*) at region of the body opposite the front. The body includes a chamber 106 to retain water (or some other liquid including liquid comprising water) that can be caused to stream from the toy water gun. The chamber 106 is shown to be elongate and extend between the front and back and includes an opening 103 via which water can pass to replenish the chamber with water.

The opening 103 may be presented in a direction facing in a backward direction of the body. The chamber 106 may be of a cross section that is substantially constant along its length. The opening is of a size substantially the same as the cross-sectional size of the chamber the cross section taken as a plane to which the elongate direction of the chamber 106 (or a direction to which the chamber 106 extends) is normal to. The body of the gun may be of a shape and configuration that is less resistant to movement in water in a direction parallel the elongate direction of the chamber compared to a direction perpendicular to the elongate direction. The body may be of a shape and configuration that makes the elongate direction length of the gun the largest of the orthogonal direction lengths. The body includes a gripping portion 116 that is formed as a pistol grip near the back 100*a* of the body.

The chamber 106 may be replenished with water by moving the gun through a body of water with the back leading the front in the moving direction. The body may be adapted and configured to present the opening 103 so that the chamber 106 is replenished with water by moving the gun through a body of water with the back leading the front in the moving direction to cause water flow into the chamber 106 via the opening 103.

The body may be adapted and configured to present the opening 103 so that the chamber 106 is replenished with water by moving the gun through a body of water/pool of water (e.g. swimming pool) with the back leading the front in the moving direction to accelerate water flow into the chamber 106 via the opening 103 when compared to allowing water to drain into the chamber 103 if the gun was not moving through the body of water.

In the preferred embodiment of the apparatus 100 as shown in the figures, the area of the opening 103 may be 3 $cm^2$, or 80 $cm^2$ or between 3 $cm^2$ to at least 80 $cm^2$. For example, the area of the opening may be at least 3 $cm^2$, at least 4 $cm^2$, at least 5 $cm^2$, at least 6 $cm^2$, at least 7 $cm^2$, at least 8 $cm^2$, at least 9 $cm^2$, at least 10 $cm^2$, at least 15 $cm^2$, at least 20 $cm^2$, at least 25 $cm^2$, at least 30 $cm^2$, at least 35 $cm^2$, at least 40 $cm^2$, at least 50 $cm^2$, at least 60 $cm^2$, at least 70 $cm^2$ or at least 80 $cm^2$.

Method of operating the apparatus 100, may include at least the following steps:
  providing the apparatus 100;
  replenishing the chamber 106 of the apparatus 100 with a liquid;

dispensing the liquid from the chamber 106 through the at least one liquid dispensing outlet 130 of the apparatus 100.

The step of replenishing the chamber of the apparatus or the water gun with a liquid may comprise at least the following steps:

moving any lid 104 that conceals or is concealing the opening 103 from the closed position to the open position;

dipping the apparatus 100 inside a pool of liquid so that the opening 103 or at least part of the opening 103 is below the surface of the liquid;

pulling the apparatus 100 from the pool.

The step of replenishing the chamber of the apparatus or the water gun with a liquid may further comprise moving any lid 104 revealing the opening 103 from the open position to the closed position after pulling the apparatus 100 from the pool.

In the above, the pool of liquid may refer to swimming pools, containers comprising liquid, rivers, seas, oceans, lakes or any suitable collection of liquid into which the apparatus may be dipped for replenishing.

In one embodiment, the liquid dispensing apparatus or the water gun is operated using one hand only.

Having the chamber 106 that is of uniform or substantially uniform in cross section from the first region 102a towards the second end regions 102b and having an opening 103 of same or substantially the same size as the cross-section of the chamber 106 can allow the chamber 106 to be quickly replenished (or filled) with the liquid.

Having an opening 103 located at or near the first end region 102a of the chamber housing 102, the user may easily dip the apparatus into a pool of a liquid (e.g. swimming pool) or similar and replenish the chamber with the liquid from the pool. In other words, if the opening 103 was not located at the first end region 102a of the chamber housing 102, the user may have to first dip the apparatus into the pool, adjust the opening to a suitable replenishing position by twisting or turning the apparatus so that the liquid from the pool enters into the chamber which can be time consuming and inconvenient. However, by having the opening 103 at an the first end region 102a which is at or near the rear/back side of the apparatus 100, the user may only need to dip the apparatus 100 into a pool and then pull the apparatus 100 out from the pool in order to replenish the chamber 106 with the liquid. Such dipping and pulling action allows faster replenishing of the chamber 106. The pulling of the apparatus 100 in the form of a water gun with its opening 103 presented in the direction of travel causes water to be forced into the chamber 106. This is much quicker than allowing water to naturally drain into the chamber 106. A pulling action by a user is also easily effected. A person merely needs to hold the apparatus 100 or the gun over a pool of water and extend and retract their elbow to dip and pull the gun into and from the water. This is a two-stage action that also relies on strong arm muscles (push and pull rather than push, swoop and pull) thereby making replenishing of the chamber fast. The gun can also be skimmed over the top of a body of water to scoop water in through the large opening of the chamber. In addition, having the opening presented at the rear of the gun and pulling the gun through water means here is less hydraulic drag on the gun. The gun is able to be moved through the water in a direction to accelerate filling and that is more streamline in moving through the body of water than if the direction of movement to accelerate filling is lateral to the elongate direction of the gun.

Further, it can be appreciated that configuration of the apparatus 100 as described above allows user to operate the apparatus 100 using one hand only. For example, the lid 104 can be moved between the open and closed position using same hand of the user that is used for dipping the apparatus to the pool of liquid and pull the apparatus from the pool once the chamber 106 is replenished with liquid.

It will of course be realised that while the foregoing has been given by way of illustrative example(s) of the present invention, all such modifications and variations thereto as would be apparent to a person skilled in the art are deemed to fall within the broad scope and ambit of the various aspects if invention as is hereinbefore described and/or defined in the claims.

As shown, the apparatus 100 is a water gun or toy water gun for use in recreational purposes. However, the apparatus 100 may be many other suitable type of liquid dispensing apparatuses, preferably handheld liquid dispensing apparatus such as but not limited to as gardening equipment for watering plants, liquid sprayers, equipment for filling up containers or balloon with liquid etc.

The invention claimed is:

1. A water gun or toy water gun for dispensing a liquid, the water gun or toy water gun comprising:
   a chamber for storing the liquid defined by a chamber housing extending along a longitudinal axis from a first end to a second end, the second end of the chamber housing being closed by an end wall, the at least one chamber being of a constant or substantially constant cross section and extending from the first end towards the second end;
   an opening at the first end of the chamber housing through which the liquid is to be received in the at least one chamber;
   a lid located proximal to the opening and adapted to pivotally move relative to the at least one chamber between a closed position in which at least a portion of the opening is concealed by the lid and an open position in which at least the portion of the opening is revealed by the lid;
   at least one liquid dispensing outlet extending through the end wall of the chamber housing thereby permitting the liquid to be dispensed during use, wherein the at least one liquid dispensing outlet extends through a nozzle fixedly attached to and protruding from the end wall, wherein the water gun or toy water gun further comprises a handle portion mounted to or integrally formed with the chamber housing, wherein the handle portion is proximal to the first end of the chamber housing, and wherein a body of the water gun or toy water gun is adapted and configured to present the opening so that the at least one chamber is replenished with water by moving the water gun or toy water gun through a body of water with a back leading a front in a moving direction to cause water flow into the at least one chamber via the opening;
   a slider movable from a location adjacent to the at least one liquid dispensing outlet toward the first end along an outer surface of the chamber housing to dispense the liquid through the nozzle; and
   a rail located below the at least one chamber housing along which the slider is adapted to slide.

2. The water gun or toy water gun as claimed in claim 1, wherein the water gun or toy water gun is a handheld apparatus.

3. The water gun or toy water gun as claimed in claim 1, wherein at least one of the chamber housing and the at least one chamber extends longitudinally from the first end to the second end, the first end being proximal to the lid and the second end being distal from the lid.

4. The water gun or toy water gun as claimed in claim 3, wherein the at least one chamber extends at least 50% of a total length of the chamber housing.

5. The water gun or toy water gun as claimed in claim 1, wherein the at least one chamber is octagonal or substantially octagonal in cross-section.

6. The water gun or toy water gun as claimed in claim 1, wherein the lid is hinged to a portion of the chamber housing and configured to pivotally move between the open position and the closed position.

7. The water gun or toy water gun as claimed in claim 1, wherein the lid comprises a locking mechanism that is configured to lock the lid to the chamber housing and unlock the lid from the chamber housing when the lid is in the closed position.

8. The water gun or toy water gun as claimed in claim 7, wherein the locking mechanism comprises a lever or a pawl with at least one tooth that is configured to engage with a complementary feature on the chamber housing to lock the lid to the chamber housing and disengage from the complementary feature on the chamber housing to unlock the lid from the chamber housing.

9. The water gun or toy water gun as claimed in claim 8, wherein the lever or the pawl is configured to move to a position that allows the at least one tooth of the lever or the pawl to engage in a snap-fit arrangement with the complementary feature on the chamber housing to lock the lid to the chamber housing when the lid is in the closed position.

10. The water gun or toy water gun as claimed in claim 1, wherein the chamber housing comprises a seal at or near a perimeter of the first end of the chamber housing.

11. The water gun or toy water gun as claimed in claim 10, wherein a shape of the seal is of a same shape or of a substantially same shape as a cross-section of the at least one chamber.

12. The water gun or toy water gun as claimed in claim 10, wherein the seal is of a same size or of substantially a same size as a perimeter of the first end of the chamber housing.

13. The water gun or toy water gun as claimed in claim 10, wherein the seal comprises a groove that is configured to sealingly engage with a complementary protrusion located at the lid when the lid is in the closed position.

14. The water gun or toy water gun as claimed in claim 13, wherein the lid comprises the internal portion of the lid and an external portion, a wall extending around an internal portion of the lid, the complementary protrusion being located at an edge of the wall that is distal from the internal portion of the lid.

15. The water gun or toy water gun as claimed in claim 14, wherein the lid comprises a plurality of protrusions or ribs in at least one of the external portion and the internal portion of the lid.

16. The water gun or toy water gun as claimed in claim 1, wherein the handle portion comprises a gripping portion extending downwardly from the handle portion, the gripping portion adapted to facilitate gripping by a user's hand.

17. The water gun or toy water gun as claimed in claim 16, wherein the gripping portion is angled with respect to the chamber housing.

18. The water gun or toy water gun as claimed in claim 16, wherein the gripping portion is angled with respect to the chamber housing towards the lid.

19. The water gun or toy water gun as claimed in claim 18, wherein the gripping portion is angled between 110 degrees to 130 degrees from the chamber housing towards the lid.

20. The water gun or toy water gun as claimed in claim 1, wherein the rail comprises one or more channels and the slider is adapted to slidingly engage with the one or more channels in order to slide along the rail.

21. The water gun or toy water gun as claimed in claim 1, wherein the rail is parallel or substantially parallel with the chamber housing.

22. The water gun or toy water gun as claimed in claim 20, wherein the one or more channels of the rail is/are parallel or substantially parallel with the chamber housing.

23. The water gun or toy water gun as claimed in claim 1, wherein the body of the gun is of a shape and configuration that is less resistant to movement in water in a direction parallel an elongate direction of the at least one chamber compared to a direction perpendicular to the elongate direction.

24. The water gun or toy water gun as claimed in claim 23, wherein the body of the gun is of a shape and configuration that makes the elongate direction length of the gun the largest of orthogonal direction lengths.

25. The water gun or toy water gun as claimed in claim 23, wherein the body of the gun includes a pistol grip near the back of the body of the gun.

26. The water gun or toy water gun as claimed in claim 23, wherein the body of the gun is adapted and configured to present the opening so that the at least one chamber is replenished with water by moving the water gun or toy water gun through the body of water with the back leading the front in the moving direction to accelerate water flow into the at least one chamber via the opening when compared to allowing water to drain into the at least one chamber if the water gun or toy water gun was not moving through the body of water.

27. The water gun or toy gun as claimed in claim 26, wherein the opening is at least from and including 3 $cm^2$ to and including at least 80 $cm^2$ in area.

28. The water gun or toy gun as claimed in claim 1, wherein the lid pivotally moves around an axis that is orthogonal to the longitudinal axis.

* * * * *